(12) United States Patent
Mizell et al.

(10) Patent No.: US 8,740,270 B1
(45) Date of Patent: Jun. 3, 2014

(54) PORTABLE ELECTRONIC DEVICE HOLDER

(76) Inventors: John Mizell, Orlando, FL (US);
Anthony Genzianelli, Oviedo, FL (US);
Daniel Deutsch, Orlando, FL (US)

(*) Notice: Subject to any disclaimer, the term of this patent is extended or adjusted under 35 U.S.C. 154(b) by 66 days.

(21) Appl. No.: 13/344,190

(22) Filed: Jan. 5, 2012

Related U.S. Application Data (63) Continuation-in-part of application No. 12/796,755, filed on Jun. 9, 2010, now abandoned.

(51) Int. Cl.
*B65G 7/12* (2006.01)

(52) U.S. Cl.
USPC .......................................... 294/25; 224/217

(58) Field of Classification Search
USPC ......... 294/25, 137, 139, 219, 150; 455/575.8;
361/679.3, 679.55, 679.03, 679.56,
361/679.58; 224/217, 218, 930; 248/125.7,
248/682, 444, 450; 16/110.1, 111.1, 430
See application file for complete search history.

(56) References Cited

U.S. PATENT DOCUMENTS

| | | | | |
|---|---|---|---|---|
| 6,608,749 B2* | 8/2003 | Hubbard | ................. | 361/679.09 |
| 6,726,070 B2 | 4/2004 | Lautner | | |
| 7,274,564 B2 | 9/2007 | Rossini | | |
| 7,428,143 B1 | 9/2008 | Jones | | |
| 7,614,599 B2 | 11/2009 | Moon | | |
| 8,243,444 B2* | 8/2012 | Kawada et al. | ............ | 361/679.59 |
| D673,573 S * | 1/2013 | Skene et al. | ................. | D14/447 |
| 2002/0122291 A1* | 9/2002 | Hubbard | ....................... | 361/683 |
| 2003/0184958 A1 | 10/2003 | Kao | | |
| 2003/0213822 A1 | 11/2003 | Lautner | | |
| 2004/0226973 A1 | 11/2004 | Kao | | |
| 2009/0219677 A1 | 9/2009 | Mori et al. | | |
| 2009/0229936 A1 | 9/2009 | Cuong | | |
| 2010/0084291 A1 | 4/2010 | Dayton | | |
| 2010/0296235 A1 | 11/2010 | Takmasa | | |
| 2011/0267748 A1* | 11/2011 | Lane et al. | ............... | 361/679.01 |
| 2011/0279959 A1* | 11/2011 | Lopez | ...................... | 361/679.03 |
| 2012/0068043 A1* | 3/2012 | Daigle et al. | .................. | 248/682 |
| 2012/0075799 A1* | 3/2012 | Pollex | ...................... | 361/679.56 |
| 2012/0097831 A1* | 4/2012 | Olukotun et al. | ............ | 248/688 |
| 2012/0170194 A1* | 7/2012 | Lord et al. | ................ | 361/679.02 |
| 2012/0170212 A1* | 7/2012 | Gallouzi et al. | ......... | 361/679.56 |
| 2012/0252543 A1* | 10/2012 | Cho | ........................... | 455/575.8 |
| 2013/0069381 A1* | 3/2013 | Sakamoto | ..................... | 294/142 |

FOREIGN PATENT DOCUMENTS

| | | |
|---|---|---|
| EP | 2244155 | 10/2010 |
| JP | 2009205531 | 9/2009 |
| KR | 20080037399 | 4/2008 |
| WO | 2009101800 | 8/2009 |

OTHER PUBLICATIONS

PCT International Search Report and Written Opinion for International Application No. PCT/US2011/034293, Nov. 29, 2011.

* cited by examiner

*Primary Examiner* — Saul Rodriguez
*Assistant Examiner* — Gabriela Puig (57) ABSTRACT

Embodiments include a rotatable member that can be removably attached to a portable electronic device. The rotatable member includes a support member that is adjustably extendable from the rotatable member. The support member is adapted to support the portable electronic device at a substantially upright angle relative to an underlying surface when the support member is extended.

17 Claims, 9 Drawing Sheets

FIG. 1

PRIOR ART

PORTABLE ELECTRONIC DEVICE HOLDER

CROSS REFERENCE TO RELATED APPLICATION

This application is a continuation-in-part of U.S. patent application Ser. No. 12/796,755 filed on Jun. 9, 2010 now abandoned, the contents of which are incorporated by reference herein in their entirety.

FIELD OF THE INVENTION

The present invention relates to the field of portable electronic device holders, and, more particularly, to a portable electronic device holder having a rotatable handle and a mechanism for allowing a portable electronic device to sit substantially upright when placed on an underlying surface.

BACKGROUND OF THE INVENTION

Portable electronic devices such as the so-called tablet PCs are becoming more popular amongst consumers. Certain tablet PCs such as the APPLE IPAD, for example, use a touch screen display, substantially reducing the need for an external keyboard or mouse.

Figure 1:
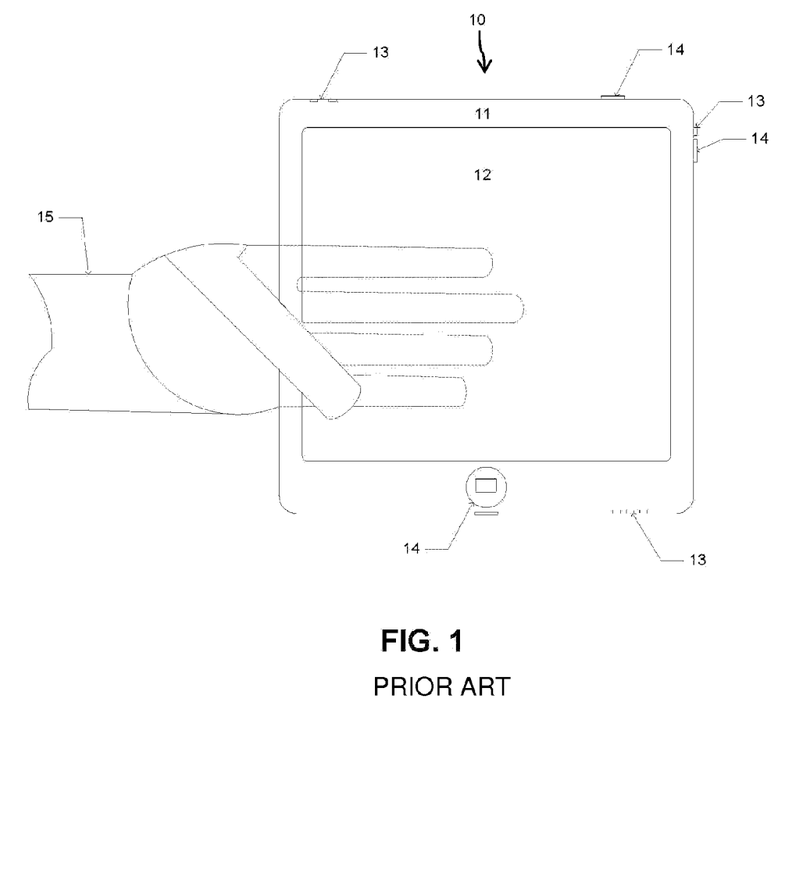
FIG. 1 is a front elevation view of a portable electronic device such as a tablet PC.
Figures 2, 3:
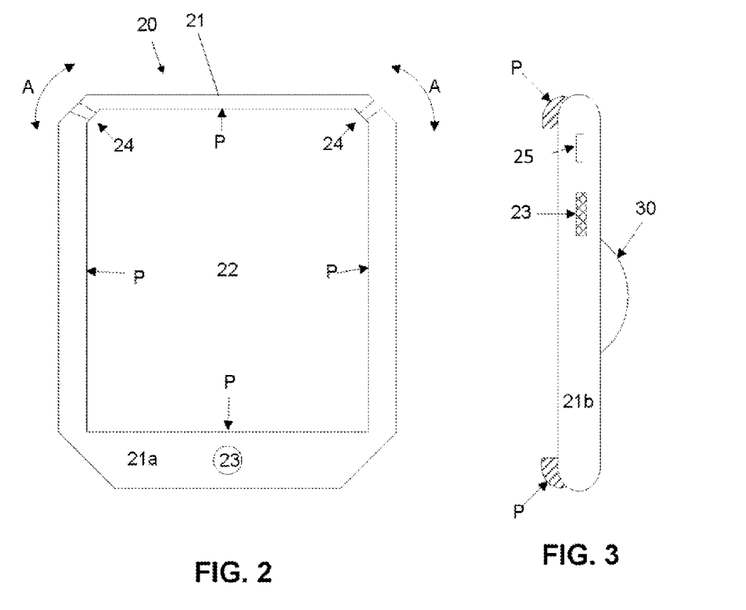
FIG. 2 is a front view of a portable electronic device holder in accordance with the invention.
FIG. 3 is a left side view of the holder shown in FIG. 1.
Figure 4:
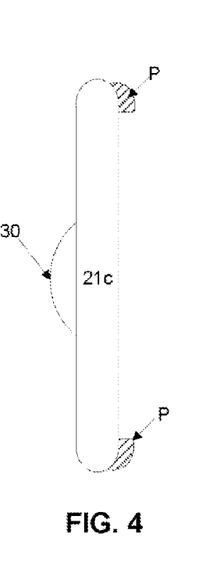
FIG. 4 is a right side view of the holder shown in FIG. 1.
Figure 5:
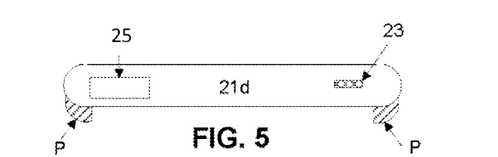
FIG. 5 is a top view of the holder shown in FIG. 1.
Figure 6:
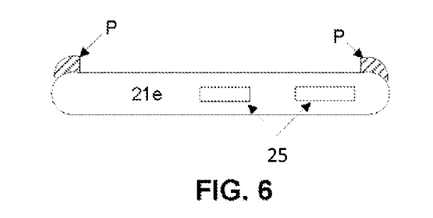
FIG. 6 is a bottom view of the holder shown in FIG. 1.

Provided in FIG. 1 is a diagram of an exemplary portable electronic device in the form of a tablet PC. The portable electronic device 10 includes a rectangular frame, a touch screen 12, a plurality of electronic ports 13 and one or more buttons. The small footprint and relatively light weight of portable electronic devices 10 such as this make them more amenable for use on the go relative to a laptop computer. In many cases, a user 15 will hold the portable electronic device with one hand while attempting to interact with the device using the other hand.

However, utilizing a portable electronic device in this manner presents several drawbacks. For example, it is common for a user to inadvertently access the touch screen while attempting to grip the frame. Further, the user cannot efficiently rotate the device from one orientation to another, from a landscape to a portrait orientation, for example, without adjusting their grip on the device. Also, because the device is not secured to the hand of the user, the user may drop the device. Additionally, when placed on a flat surface, such as a table, the device will lay such that the touch screen is oriented parallel to the flat surface rather than at a more appropriate viewing angle for the user.

The patent literature discloses several examples of other portable electronic device holders. These examples include U.S. Patent Application Pub. No. 2004/0226973 and U.S. Pat. No. 6,726,070. However, none of the above devices overcomes each of the drawbacks described above.

Accordingly, what is needed in the art is a portable electronic device holder capable of allowing a user to securely hold a portable electronic device attached thereto, to change the orientation of the portable electronic device easily and securely and to position the portable electronic device at a comfortable viewing angle relative to the line of sight of a user when the portable electronic device is not being held.

SUMMARY OF THE INVENTION

The present invention is directed to an apparatus that satisfies this need. One object of an embodiment of the invention is to provide a handle that can be removably attached to the device in such a way that, when the device and handle are attached, the device is rotatable relative to the handle and, when the device and handle are not attached, the handle can be placed on an underlying surface and can support the device at a substantially upright angle relative to an underlying surface. In exemplary embodiment this support is provided by a support surface that defines and opening, a support surface that extends outwardly from the handle, or a combination thereof.

Another object of an embodiment of the invention is to provide a structure that protectively holds the portable electronic device and can be attached to the handle. The handle may be removably attached from the structure by operating an actuator, such as a button, that is operably linked to one or more attachment members that contact the structure. In a particular embodiment, when the structure and handle are not attached, the handle can be placed on an underlying surface and can support the structure at a substantially upright angle relative to the underlying surface.

These and other objects, aspects, and advantages of the present invention will be better appreciated in view of the drawings and following detailed description of the preferred embodiments.

DETAILED DESCRIPTION OF THE PREFERRED EMBODIMENTS

In the Summary of the Invention above and in the Detailed Description of the Invention and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

The term "comprises" is used herein to mean that other features, steps, etc. are optionally present. When reference is made herein to a method comprising two or more defined steps, the steps can be carried in any order or simultaneously (except where the context excludes that possibility), and the method can include one or more steps which are carried out before any of the defined steps, between two of the defined steps, or after all of the defined steps (except where the context excludes that possibility).

In this section, the present invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art.

FIGS. 2-7 illustrate one embodiment of a portable electronic device holder that is useful for understanding the inventive concepts disclosed herein. The holder 20 can include a structure 21 and a rotatable unit 30. The structure 21 is preferably constructed from a hardened resilient material having good strength and impact absorption ability such as injection molded plastic or carbon fiber material, for example, however other materials are contemplated. For instance, one alternative embodiment can include an outer shell constructed entirely or mostly from stiff rubber or other elastic material having good tensile strength and excellent impact absorbing qualities.

In the embodiments shown herein, the holder 20 can hold a portable electronic device, such as a tablet PC in the form of an APPLE IPAD, for example. However, one of skill in the art will recognize that the inventive concepts described herein can be equally applied to portable electronic devices, including tablet PC's of other makes and models without deviating from the spirit of the invention. Accordingly, the inventive concepts are not limited to one specific portable electronic device.

Referring to FIGS. 2-6, a portable electronic device holder according to an embodiment of the invention includes a holder structure 21 having a front surface 21a, a right surface 21b, a left surface 21c, a top surface 21d and a bottom surface 21e to form a roughly rectangular body having an opening 22 into which a portable electronic device can be securely inserted.

Additionally, each of the surfaces can include a lip/protrusion (P) along the periphery that forms the opening 22. As such, the opening 22 can have a depth that is greater than that of the portable electronic device. In one embodiment, the lip/protrusion P can be constructed from the same material as the shell, and can be formed as an integral part of the shell. Alternatively, the protrusion P can be constructed from a soft cushion material such as rubber or nylon padding, for example, and may be attached to the end of the shell to form the protrusion. In this regard, when the portable electronic device is inserted into the opening, the screen is recessed with respect to the protrusions P, thus providing protection against inadvertent contact with foreign objects. Moreover, in the event the holder 20 is dropped or subjected to impact, each of the protrusions P in conjunction with the surfaces 21a-21f can flex, thus acting as impact absorption elements.

In another embodiment, the holder structure 21 can include a plurality of access points such as access openings 25 that allow the user to access certain components of the portable electronic device, which may include data ports, power inputs, speakers, headphone jacks, buttons or any other component that be found on a portable electronic device. Alternatively, access points can also include one or more embossed sections 23 for allowing the buttons of the portable electronic device to be utilized by a user when positioned within the holder 20. The front surface 21a can further include one or more optional gaps 24 for allowing the top surface 21d of the holder 10 to bend (see arrow A) in order to allow the portable electronic device to be more easily inserted into the opening 22.

In certain alternate embodiments (not shown), the inside portion of the holder structure 21 can be lined with an impact absorbing material such as rubber or neoprene, for example. In this regard, the impact absorbing material can provide additional cushion to the portable electronic device when impacted by a foreign object, or dropped.

Figure 7:
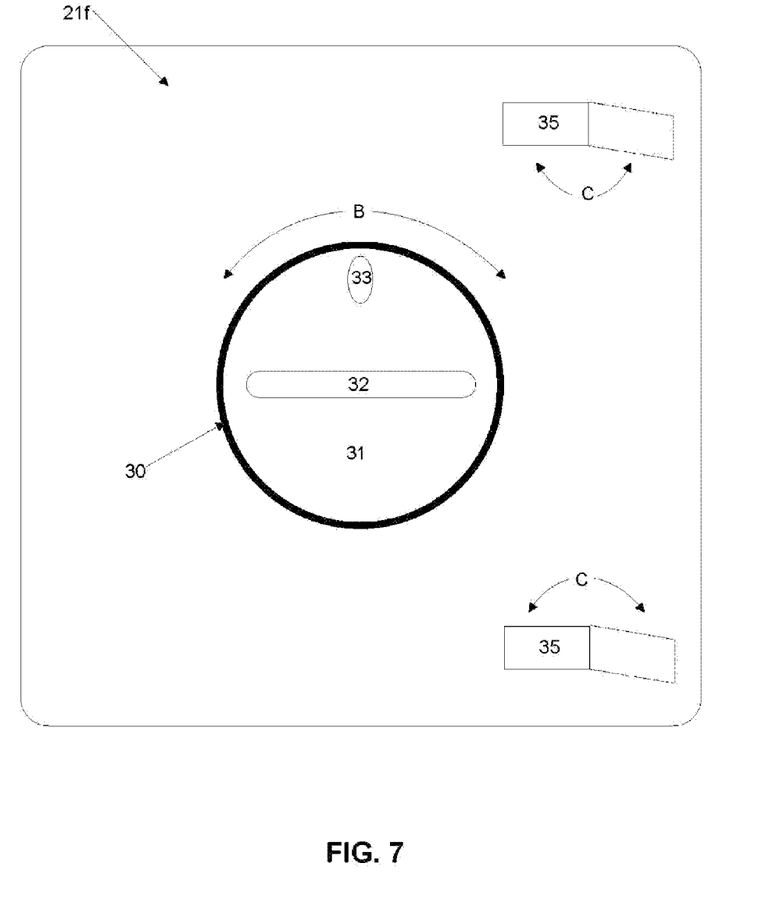
FIG. 7 is a back view of the holder shown in FIG. 1.

Referring to FIG. 7, a back side of the holder 20 in accordance with one embodiment of the present invention is shown. The back surface 21f includes a rotatable unit 30 having a raised area 31 for ergonomically accommodating the hand of a user, a strap 32, which is preferably adjustable, and can be used to securely positioning the user's hand to the rotatable unit and an optional actuator 33, such as a catch/release button or a switch that can be used to remove the rotatable unit 30 from the holder structure 21. In a preferred embodiment the strap comprises a VELCRO-type material for securing the hand of the user.

Advantageously, the user can rotate the rotatable unit 30 360 degrees (see arrow B) in either direction with respect to the holder structure 21. Moreover, rotatable unit 30 can include a plurality of internal stops/indentions (not shown) into which an attachment member (not shown) mechanically linked to the actuator 33 can engage, allowing the user to lock the rotatable unit 30 to a specified position in order to prevent further movement until desired. The rotatable unit 30 can include a front side and a back side which can rotate independently of each other and can be constructed from materials including, but not limited to, plastic or composite materials. To this end, in certain embodiments, the rotatable unit 30 is secured to the back side of the holder structure 21 using a standard rotational joint arrangement and can rotate to any angle and be secured at that angle. Alternatively, the rotatable unit 30 can be removably secured to the back side by a non-permanent means such as, for example, one or more locking grooves, hook and loop connections, magnetic elements, compression fittings or combinations thereof. It is to be noted that the strap 32 can be substituted with any known material or configuration that can be utilized for securing the hand of the user to the rotatable unit 30.

Figure 8:
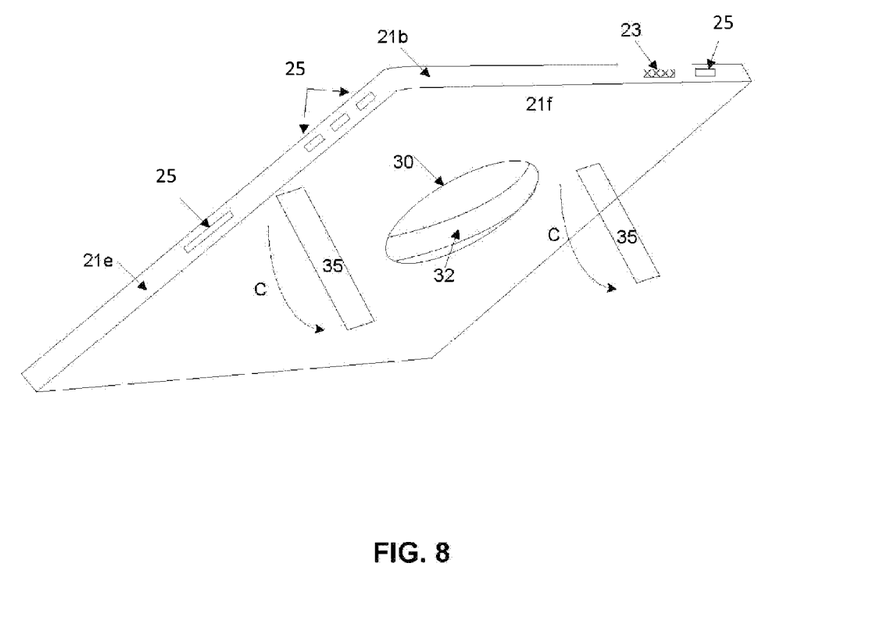
FIG. 8 is a prespective view of the back side of a holder in accordance with the invention.
Figure 9:
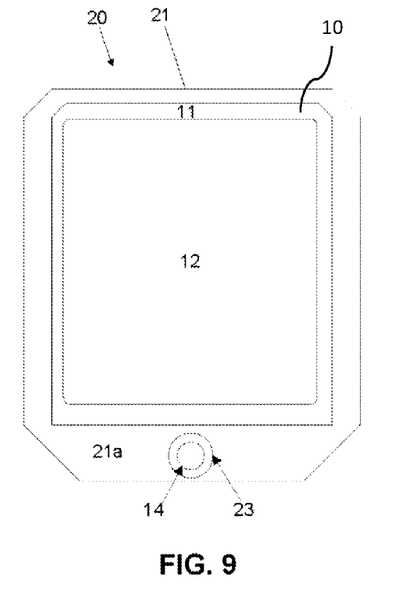
FIG. 9 is a front view of the holder shown in FIG. 1 with a portable electronic device located thereon.
Figure 10:
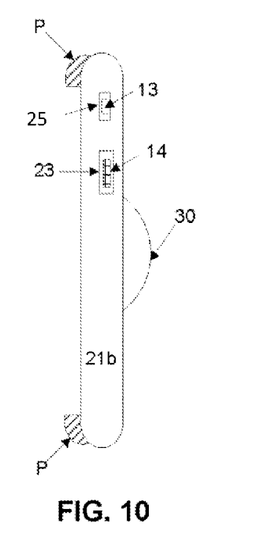
FIG. 10 is a is a left side view of the holder shown in FIG. 9.
Figure 11:
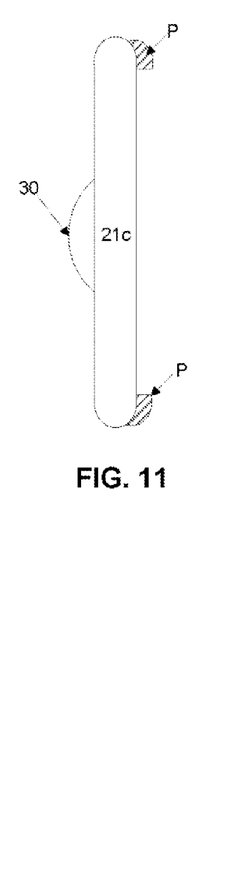
FIG. 11 is a right side view of the holder shown in FIG. 9.
Figure 12:
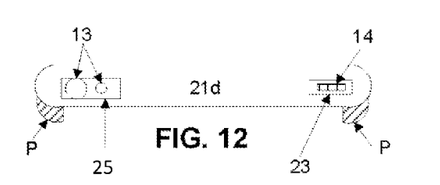
FIG. 12 is a top view of the holder shown in FIG. 9.
Figure 13:
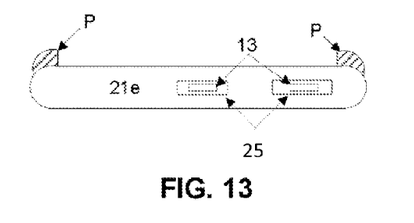
FIG. 13 is a bottom view of the holder shown in FIG. 9.

Referring to FIG. 8, a portable electronic device holder 20 according to an embodiment of the invention includes one or more support members 35. The support members 35 are configured to support the holder at an upright angle relative to a flat surface underlying the support surface. According to the embodiment shown in FIG. 8, the support members 35 are provided as pegs that can be rotated or extended outwardly with respect to the back of the holder 20. (See arrow C). Such a feature can allow the portable electronic device to be oriented at an angle suitable for reading and/or typing when placed on a flat surface. In other embodiments, the support member(s) 35 are located, for example, on the rotatable unit 35 or on one of the other surfaces on the holder structure 21.

Referring now to FIGS. 9-13, a portable electronic device holder 20 according to an embodiment of the invention is shown holding a portable electronic device 10. In this embodiment, the body 11 of the portable electronic device is protected on all sides by the holder 20. Moreover, the screen 12 of the portable electronic device 10 is protected against inadvertent impact by the protrusions P located along the periphery of the opening 22. This arrangement allows the holder 20 to be positioned or placed at any orientation without damaging the portable electronic device 10. Additionally, the access points, such as access openings 25 and embossed sections 23 located on surfaces 21a-21e can align with access ports 13 and buttons 14 of the portable electronic device 10, respectively, to allow the user to use and manipulate all of the features of the portable electronic device 10 when it is within the holder 20.

Figure 14:
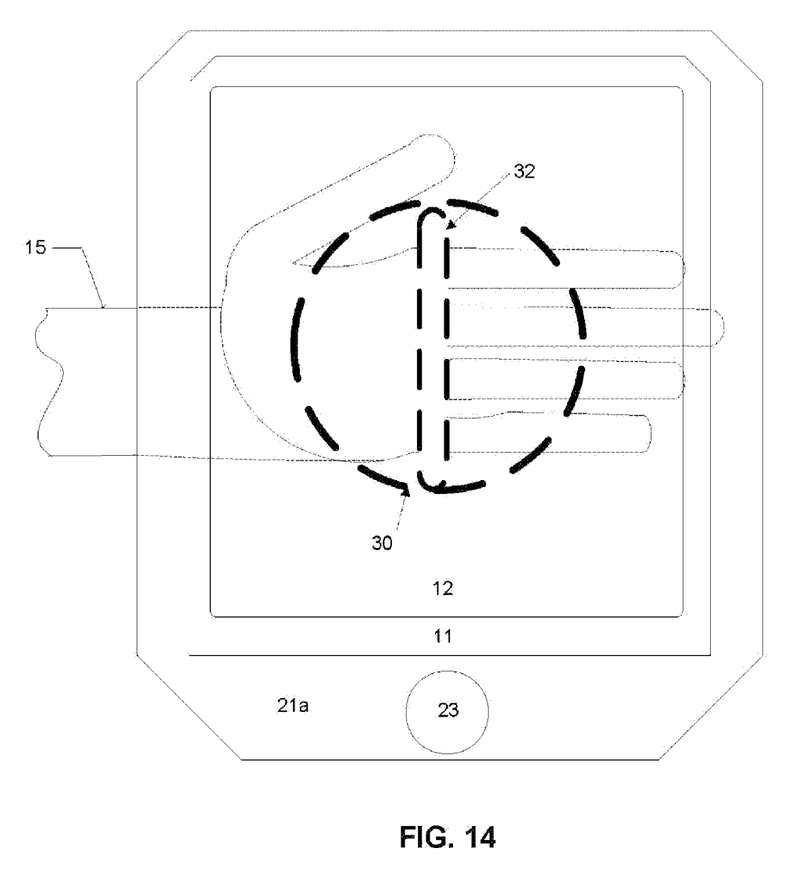
FIG. 14 is a front view of the holder shown in FIG. 9 that also shows the hand of a user attached to the back side of the holder with a securing mechanism.

Referring to FIG. 14, a portable electronic device holder 20 according to an embodiment of the invention is shown with the hand of the user 15 attached thereto. When a portable electronic device 10 is inserted into the enclosure 20, the user 15 can securely hold and rotate the portable electronic device 10 to any desired angle without substantially obstructing the screen 12. Advantageously, once the user 15 secures his or her hand to the rotatable unit 30, the user does not need to reposition his or her grip when rotating the holder structure 21. For example, the user can change the orientation landscape to portrait mode without the risk of dropping the portable electronic device 10. Thus, in the embodiments in which this feature is provided, the portable electronic device holder 20 of the present invention is advantageously suited for use on the go.

Accordingly, the holder 20 as described herein can allow a user to securely hold a portable electronic device 10 and transition between a portrait and landscape mode, while providing protection to the portable electronic device 10 against damage from accidental impact. Moreover, the holder 20 can allow a portable electronic device 10 held therein to be stably positioned at an angle for viewing and typing when placed on a flat surface.

Figure 15:
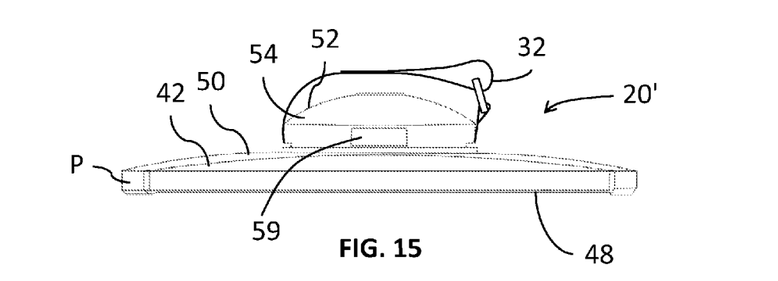
FIG. 15 is a side view of an alternative embodiment of the holder in accordance with the invention with a rotatable member attached.
Figure 16:
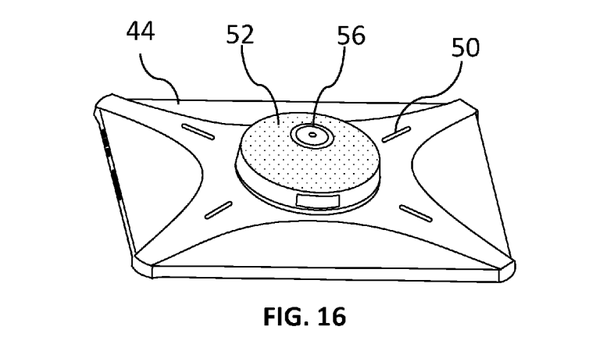
FIG. 16 is a perspective view of the back side of the holder shown in FIG. 15 with the rotatable member attached.
Figure 17:
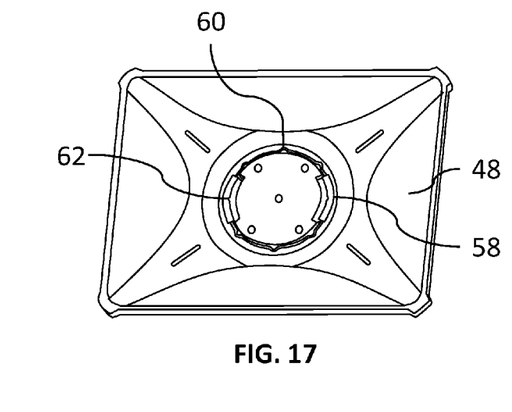
FIG. 17 is a perspective view of the front side of the holder shown in FIG. 15 with the rotatable member attached.

Referring to FIGS. 15-17, a portable electronic device holder 20' according to another embodiment of the invention comprises a similar structure 42 including a back side 44, a front side 48, a support frame 50, and an alternative version of a rotatable unit 52. From the reference frame of FIG. 15, the back side 44 is downwardly contoured from the center. The support frame 50 reinforces the structure 42 to prevent flexure of the structure and is preferably substantially X or cross-shaped. On each of the external corners of the structure 42, the frame extends slightly beyond to remaining portions of the structure to form protrusions P, which will help prevent the portable electronic device from being damaged if dropped. When viewed from the side, as in FIG. 15, the protrusions P also protrude outwardly from the front side 48 to prevent the screen of the portable electronic device from being damaged. A strap 32 may be attached to the rotatable unit 52 for securing the hand of a user thereto.

In further detail, the rotatable unit 52 comprises a raised grip portion 54, a button 56, and an extendable member 59. The raised grip portion 54 preferably mimics the shape of a cupped hand to assist the user in ergonomically holding the rotatable unit 52. The button 56 actuates a plurality of attachment members 58, preferably through a spring type mechanism. When the button 56 is pressed the attachment members 58 move inwardly toward the center of the rotatable unit 52, allowing the rotatable unit to be removed from the structure 42. When the button 56 is released, the attachment members 58 move outwardly to their original positions.

As in the previous embodiment, the rotatable unit 52 is preferably rotatable 360 degrees and can be locked into a preferred orientation by the user. One preferred mechanism for achieving this locking function is to allow the spring loaded attachment members 58 to engage with the structure 42 in the preferred orientations. In the embodiment shown in FIG. 17, a plurality of divots 60 are formed in the structure 42. As the rotatable unit 52 is rotated, a protrusion 62 located on the attachment member 58 engages with the divots 60. The protrusions 62 can be disengaged from the divots 60 simply by rotating the structure.

Figure 18:
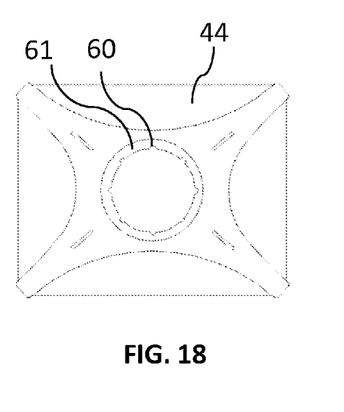
FIG. 18 is a back view of the holder shown in FIG. 15 without the rotatable member attached.
Figure 19:
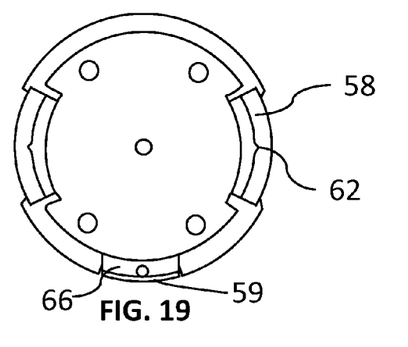
FIG. 19 is a bottom view of a rotatable member in accordance with the invention.
Figure 20:
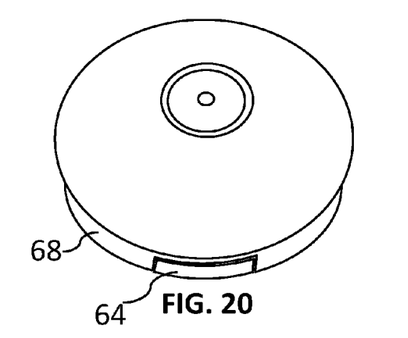
FIG. 20 is a perspective view of the top of the rotatable member shown in FIG. 19.
Figure 21:
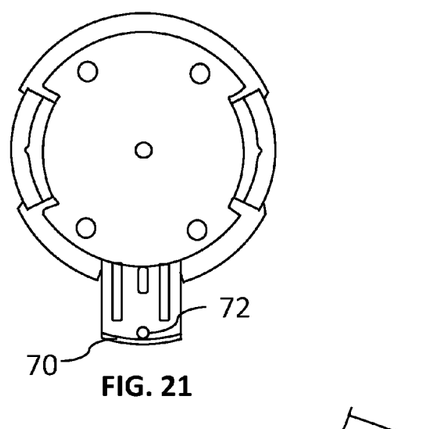
FIG. 21 is a bottom view of the rotatable member shown in FIG. 19 with the extendable member extended.
Figure 22:
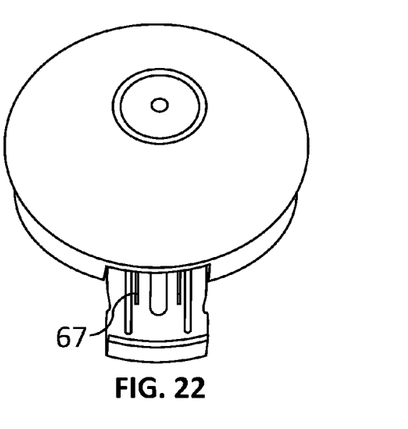
FIG. 22 is a perspective view of the top of the rotatable member shown in FIG. 19 with the extendable member extended.

Referring to FIG. 18, when the rotatable member 52 is removed from the structure 42, additional details of the attachment mechanism are more visible. Specifically, the structure 42 includes an annular shaped attachment member 61 into which the divots 60 are formed. The rotatable member 52 is engaged with the attachment member 61 by inserting the rotatable member into the opening defined by attachment member 61.

Referring now to FIGS. 19-22, additional details of the rotatable unit 52 removed from the structure 42 are shown. The extendable member 59 comprises an outer surface 64, a bottom surface 66, and a plurality of raised members 67. The extendable member 59 may be slidably extended outward from the rotatable unit 52 by the user. Preferably, when not extended, the extendable member 59 fits within the interior of the rotatable unit 52 such that its outer surface 64 is substantially flush with the rotatable unit outer surface 68. The extendable member 59 further comprises a shoulder 70 and a hole 72 to assist the user in extending the extendable member 59 with the user's finger.

Figure 23:
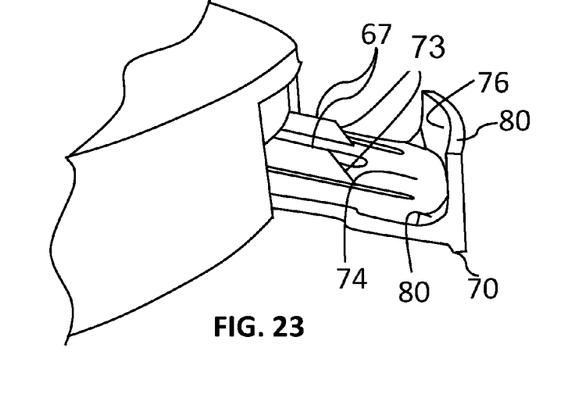
FIG. 23 is a perspective view from the side of the rotatable member (partially cut for clarity) shown in FIG. 19 with the extendable member extended.
Figure 24:
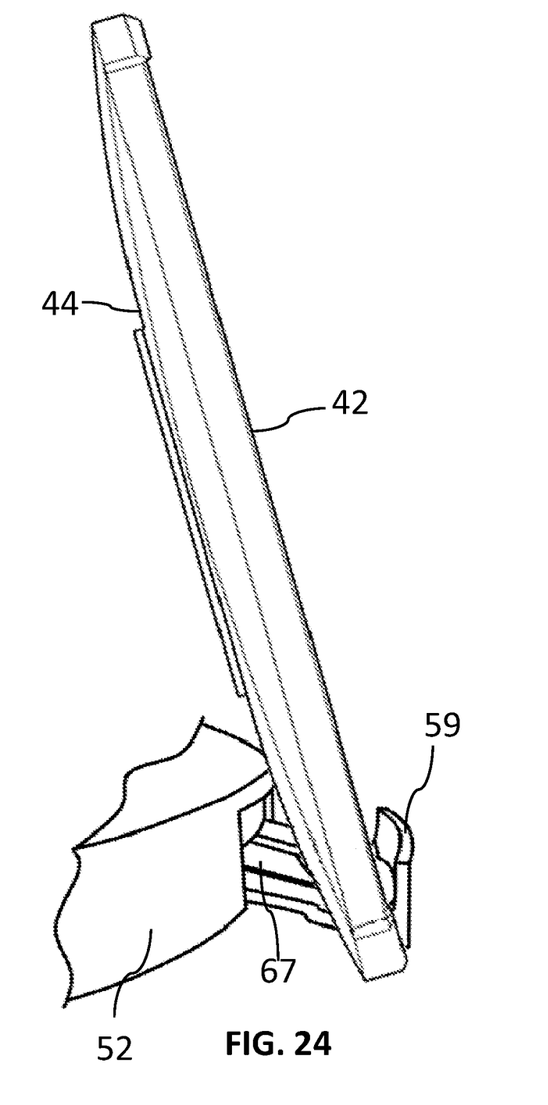
FIG. 24 is the rotatable member shown in FIG. 23 supporting a holder in a substantially upright position relative to the underlying surface.

One advantageous aspect of an embodiment of the invention is that that the holder 20' is adapted to support the portable electronic device in a substantially upright position in either the portrait or landscape orientation. This function allows the user to easily access the screen of the device without holding the device in the user's hands. Referring to FIGS. 23 and 24, in a preferred embodiment, the rotatable unit 52 is removed from the structure and is placed on an underlying surface such as a table. When the extendable member 59 is in the extended position, the extendable member 59 provides a plurality of surfaces that support the structure 42 in the upright position. In the embodiment shown, the raised portion 67 includes a front raised portion surface 73 that supports the back side 44 of the structure 42. The bottom of the structure 42 is supported by the top side 74 of the extendable member 59. An inner surface 76 on the extendable member's wall 80 supports the front side 48 of the structure 42. A pair of contoured surfaces 73 further supports the structure 42.

The previously described embodiments of the invention have many advantages. Some, but not all, of those advantages are listed here. Not all of these advantages are required by all embodiments of the invention. Certain embodiments of the invention advantageously allow a user of a portable electronic device to securely hold the portable electronic device in a protective structure while also being able to rotate the device into a desired orientation without the user needing change his or her grip. This advantage is provided by including a rotatable unit that is preferably ergonomically shaped and can be secured to the users hand via a fastening mechanism, such as a strap. Embodiments of the invention also support the device in a substantially upright position on an underlying surface. In this context, the device may be supported by an extendable member that can be outwardly extended from the rotatable unit or from a surface of the holder.

The present invention has been described hereinabove with reference to the accompanying drawings, in which preferred embodiments of the invention are shown. Unless otherwise defined, all technical and scientific terms used herein are intended to have the same meaning as commonly understood in the art to which this invention pertains and at the time of its filing. Although various methods and materials similar or equivalent to those described herein can be used in the practice or testing of the present invention, suitable methods and materials are described. However, the skilled should understand that the methods and materials used and described are examples and may not be the only ones suitable for use in the invention.

Further, any publications, patent applications, patents, and other references mentioned herein are incorporated by reference in their entirety as if they were part of this specification. However, in case of conflict, the present specification, including any definitions, will control. In addition, as noted above, materials, methods and examples given are illustrative in nature only and not intended to be limiting.

Accordingly, this invention may be embodied in many different forms and should not be construed as limited to the illustrated embodiments set forth herein. Rather, these illustrated embodiments are provided so that this disclosure will be thorough, complete, and will fully convey the scope of the invention to those skilled in the art. Therefore, in the specification set forth above there have been disclosed typical preferred embodiments of the invention, and although specific terms are employed, the terms are used in a descriptive sense only and not for purposes of limitation. The invention has been described in some detail, but it will be apparent that various modifications and changes can be made within the spirit and scope of the invention as described in the foregoing specification and as defined in the appended claims.

Any element in a claim that does not explicitly state "means for" performing a specified function, or "step for" performing a specified function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

That which is claimed is:

1. A portable electronic device holder comprising:
a handle adapted to be removably attached to a device in such a way that, when the device and handle are attached, the device is rotatable relative to the handle and, when the device and handle are not attached, the handle can be placed on an underlying surface and can support the device at a substantially upright angle relative to the underlying surface wherein the handle includes a raised portion adapted to support the hand of a user with a mechanism for securing the hand thereto; a base opposite the raised portion and contacting the underlying surface when placed thereon; an outer surface extending circumferentially between the raised portion and base; and a support member that is extendable relative to a central portion of the handle by passing through an opening in the outer surface to at least partially contact the underlying surface.

2. The holder of claim 1, wherein the handle further comprises a support surface which can support the device at the substantially upright angle.

3. The holder of claim 1, wherein the support surface is located on a support member that extends outwardly relative to a central portion of the handle.

4. The holder of claim 3, wherein the support member is adjustably extendable relative to the central portion of the handle.

5. The holder of claim 3, wherein the support member is adjustably extendable from an inner surface of the handle.

6. The holder of claim 1, wherein the handle further comprises an actuator operably linked to one or more attachment members that allow the device to be removably attached.

7. The holder of claim 1, wherein the handle further comprises a raised portion adapted to support the hand of a user and a mechanism for securing the hand thereto.

8. The holder of claim 1, further comprising a frame having a plurality of surfaces adapted to hold the device therebetween, one of the surfaces including a portion designed to be removably attached to the handle.

9. A portable electronic device holder comprising:
a rotatable member adapted to be removably attached to a portable electronic device;
a support member adjustably extendable relative to a central portion of the rotatable member;
a support surface located on the support member, the support surface being adapted to support the portable electronic device at a substantially upright angle relative to an underlying surface when the support member is extended; wherein the rotatable member includes a raised portion adapted to support the hand of a user with a mechanism for securing the hand thereto; a base opposite the raised portion and contacting the underlying surface when placed thereon; an outer surface extending circumferentially between the raised portion and base; and the support member is adjustably extendable relative to a central portion of the handle by passing through an opening in the outer surface to at least partially contact the underlying surface.

10. The holder of claim 9, wherein the support member is adjustably extendable from an inner surface of the rotatable member.

11. The holder of claim 9, wherein the rotatable member further comprises one or more moveable attachment members that allow the rotatable member to be removably attached.

12. The holder of claim 9, wherein the rotatable member further comprises a raised portion adapted to support the hand of a user and a mechanism for securing the hand thereto.

13. The holder of claim 9, further comprising a frame having a plurality of surfaces adapted to hold the device therebetween, one of the surfaces including a portion designed to be removably attached to the rotatable member.

14. A portable electronic device holder comprising:
a rotatable handle comprising an actuator and one or more attachment members operably linked to the actuator;
a structure comprising a plurality of surfaces that are adapted to hold the portable electronic device therebetween and an attachment portion that engages with the attachment members;
a support member that is adjustably extendable relative to a central portion of the rotatable handle;

a support surface located on the support member, the support surface being adapted to support the portable electronic device at a substantially upright angle relative to an underlying surface when the support member is extended; and wherein the actuator allows a user to release the rotatable handle from the structure; wherein the rotatable handle includes a raised portion adapted to support the hand of a user with a mechanism for securing the hand thereto; a base opposite the raised portion and contacting the underlying surface when placed thereon; an outer surface extending circumferentially between the raised portion and base; and the support member is adjustably extendable relative to a central portion of the handle by passing through an opening in the outer surface to at least partially contact the underlying surface.

15. The holder of claim 14, wherein handle further comprises a raised portion adapted to ergonomically support the hand of a user and a mechanism for securing the hand of the user thereto.

16. The holder of claim 14, wherein the support member is adjustably extendable from an interior surface of the handle.

17. The holder of claim 14, further comprising a plurality of protrusions for preventing damage to the portable electronic device when located in the structure.

* * * * *